Patented Dec. 17, 1946

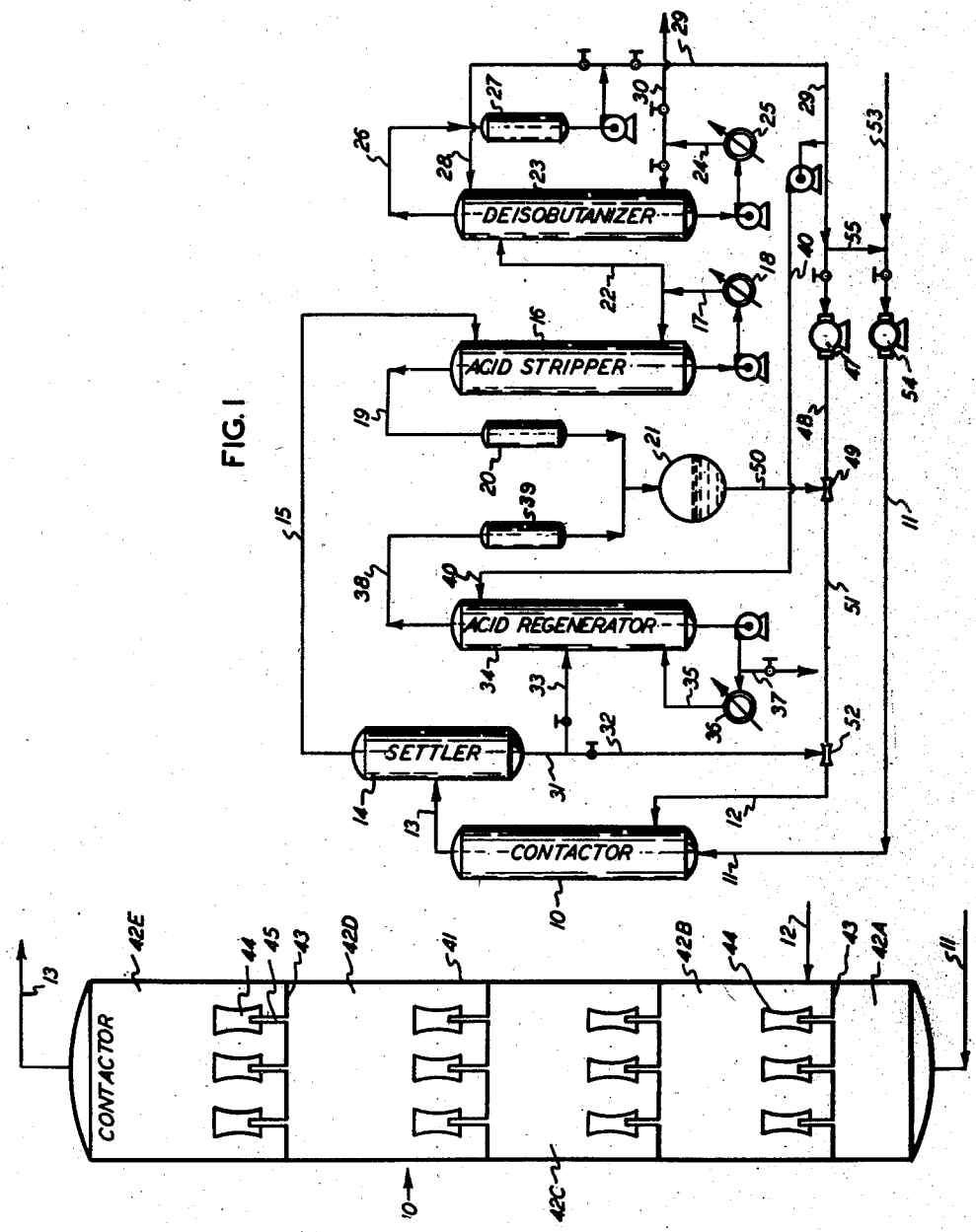

2,412,863

UNITED STATES PATENT OFFICE 2,412,863

CIRCULATION AND CONTACTING OF ACID CATALYSTS

John C. Bolinger, San Marino, and Paul W. Prutzman, Los Angeles, Calif., assignors to Socony-Vacuum Oil Company, Incorporated, New York, N. Y., a corporation of New York Application November 15, 1944, Serial No. 563,539

2 Claims. (Cl. 260—683.4)

This invention has to do with processes for the alkylation of paraffin hydrocarbons with olefins, such as the alkylation of isobutane with butene to form isooctane, and particularly with such processes wherein the catalyst used is hydrofluoric acid or material of the type of that catalyst, such as certain fluorides, other halides and the like having highly acidic and corrosive properties.

In such processes the general scheme of operation is one in which a hydrocarbon feed stream containing the paraffinic and olefinic reactants is contacted with the liquid catalyst and the reaction mixture passes to a settler in which a hydrocarbon phase separates from an acid phase. The acid is returned to the contacting step, a small proportion of the cycled stream being split off and treated to remove certain impurities. The hydrocarbon phase is partially distilled to remove entrained acid, which is returned to the contacting step. The deacidified hydrocarbons are twice fractionated, to remove isobutane, which is recycled, and to remove normal butane, which is withdrawn from the system. The residue from the second fractionation is the crude alkylate product.

Hydrogen fluoride, the catalyst most used in processes of this type, is a strongly acid and highly corrosive liquid. In these processes, which operate at superatmospheric temperatures and pressures, it is the present practice to pump the acid itself as well as overhead fractions containing it, from one part of the apparatus to another. The maintenance of the various pumps required for this purpose is the source of considerable expense and even of interruptions to the continuity of the operation.

The primary object of the present invention is so to modify the apparatus and the flows of the systems currently used as to avoid any pumping of acid or of distillates containing acid by means of mechanical pumps, the power required for transferring such liquids being applied to the acid-free streams of charge stock and recycled isobutane.

The general operating scheme, which is conventional as to its basic steps, will first be described and, thereafter, the modifications which are the subject of the invention. In the attached drawing, Fig. 1 is a diagram or flow sheet of the operation, indicating both conventional and novel elements, and Fig. 2 is a vertical section through a preferred form of contactor applicable to the method herein described.

plied with a stream of isobutane+butene through conduit 11 and with a mixed stream of recycled hydrocarbons and acid through conduit 12. After contacting under suitable conditions of time and temperature, the reaction mixture (consisting substantially of the alkylate product, excess isobutane and entrained acid) passes through conduit 13 to a settling vessel 14 in which a hydrocarbon phase separates from an acid phase.

The hydrocarbon phase passes continuously through conduit 15 to an acid stripper 16 which is heated by circulation of bottoms through a loop 17 including a reboiler 18. The overhead from the stripper, consisting of isobutane together with more or less acid, passes through conduit 19 to a condenser 20, the condensate being collected in a surge tank 21.

The bottoms from the acid stripper, consisting of the alkylate product, isobutane and some normal butane, pass through conduit 22 to a fractionating tower 23 (the deisobutanizer) which is heated by circulation of bottoms through a loop 24 including a reboiler 25.

The overhead from tower 23, consisting substantially of isobutane, passes as vapor through conduit 26 and is liquefied in condenser 27. A sufficient quantity of the condensate is returned to the top of the tower, as at 28, as reflux liquid, the remainder passing through conduit 29 to be returned to the contactor in a manner which will be described.

The bottoms from tower 23, consisting of the alkylate product with some normal butane, leaves the above described system at 30. This product is subjected to certain further steps: a fractionation to remove normal butane; a solid adsorbent treatment, and a fractionation into light and heavy alkylate; with which we are not here concerned.

The acid phase separating in the settler is drawn through conduit 31 and divided into two streams, the greater proportion being returned to the contactor through conduit 32 and other elements hereinafter referred to. A minor portion, which may be of the order of from one per cent to several per cent of the cycled stream, is diverted through conduit 33 into an acid regenerator 34. This is preferably a plate tower heated by circulation of bottoms through a loop 35 including a reboiler 36.

The bottoms collecting in this tower consist of certain higher boiling hydrocarbons, a side product of the catalysis, commonly known as the "polymer." These bottoms are withdrawn as of this step is to prevent the accumulation of these high boiling hydrocarbons in the recycled acid.

The overhead from the regenerator, consisting of acid and various volatile hydrocarbons, passes as vapor through conduit 38, is condensed at 39 and is collected in a surge tank, which may be the tank 21 previously referred to. The regenerator is refluxed at 40 with isobutane drawn from conduit 29 or other convenient source.

Up to this point, all the steps described, in the broad terms in which they are described, are well known and in common use, and the invention resides in the novel steps hereinafter recited.

Referring now to Fig. 2, the preferred form of contactor generally indicated at 10 consists of a vertically disposed, cylindrical shell 41 divided into a plurality of compartments 42A/42E by rigid partition plates 43—43. Within each of these compartments except the lowermost is placed a plurality of Venturi tubes 44—44, the jet 45 of each being fixed in one of the partition plates and communicating with the compartment next below.

A stream of hydrocarbon under high pressure being introduced into the lowermost compartment 42A, as through conduit 11, and a stream of recycled acid being introduced into the same or the next higher compartment, as through conduit 12, the liquids (acid and hydrocarbon) in compartment 42B are maintained in a state of at least incipient turbulence by the action of the Venturi tubes 44, the acid which settles to the bottom of the compartment being lifted and intimately intermixed with the oil and the mixture ejected upwardly.

In the upper and relatively quiescent portion of the compartment a partial separation of the acid occurs, the bulk of the acid returning to the pool in the lower portion of the compartment while a variable and controllable portion is carried forward to the next compartment with the hydrocarbon, which continuously progresses upwardly through the contactor.

The time of residence in the contactor is determined for a shell of any given capacity, by the velocity of the streams fed to it. The intimacy of intermixture and, in consequence, the amount of acid entrained in the reaction mixture passing from the uppermost compartment to the settler, are controlled by varying the velocities through the jets 45, i. e., by varying the total cross sectional area of jet in each plate. While the static pressure in the shell will decrease from compartment to compartment upwardly, the pressure drop across each partition is independent of static pressures and will be fixed by the relation of total jet area to rate of flow through the shell. All of the variables of contact time, intimacy and carry-over are thus readily controlled in the proportioning of the apparatus to its duty.

Returning now to Fig. 1, the stream of isobutane yielded by deisobutanizer 23 and flowing through conduit 29 passes to the suction of a pump 47 capable of raising the stream to a relatively high pressure, of the order of several hundred pounds gauge. The stream discharged by this pump passes through conduit 48 to a Venturi aspirator 49 which withdraws from surge tank 21, through conduit 50, the mixture of hydrocarbons and acid discharged into it by the regenerator and the stripper. The conjoined streams flow through conduit 51, still under high pressure, to a second venturi 52 which aspirates into the stream, through conduit 32, the acid phase separated in settler 14. The mixed stream, which now embraces all the acid products separated in the system, is injected into the lower part of contactor 10 through conduit 12, preferably into compartment 42B as shown in Fig. 2.

A stream of isobutane+butane feed, from a source not shown, enters the system through conduit 53 and passes to the suction of a high pressure pump 54. The discharge from this pump is directed into the lowermost compartment 42A of contactor 10 through conduit 11. By these means the total feed and recycle streams are brought together in the lower end of the contactor to pass upwardly through it in mutual contact.

Fig. 1 shows two pressure pumps 47 and 54 arranged in parallel, where one obviously would suffice. The reason for this provision is that the aspiration of acid oil from surge tank 21 and of acid from settler 14 and their delivery into the base of the contactor require a much higher pressure head than is necessary for the delivery of the clear feed stream into the contactor. At the same time, a small proportion of the total volume of feed plus isobutane recycle suffices for this aspiration. Pump 47 may therefore be a relatively small pump adapted to a high discharge back pressure, while pump 54 may be materially larger and adapted to a lower discharge head, thus saving materially on pumping power. Where two pumps are used as illustrated, it is desirable to provide a cross-over connection 55 between conduits 29 and 53 to permit a portion of the isobutane recycle to pass through the lower pressure pump.

If it is preferred to operate with a single pressure pump, one of the pumps 47 or 54 may be omitted and the discharge from the other branched into conduits 11 and 48. Or, alternatively, pump 47 and conduits 48, 51 and 12 may be omitted and aspirators 49 and 52 placed in the course of conduit 11.

The division of the contactor into five compartments as illustrated in Fig. 2 is exemplary only and is by no means critical. A fair result may be had with three or even with two compartments, all of the reactants being introduced into the lowermost. This, however, will require very high pressure drops across the partition plates in order to provide enough turbulence to ensure sufficient time of contact for most purposes. The greater the number of successive intermixtures of hydrocarbon with acid, the lower will be the requisite degree of agitation in each compartment, and, as a rule, a tower divided into several compartments arranged serially will function with a lower pressure drop from end to end than will be required for one with a smaller number of divisions.

The contactor is illustrated as having the compartments superimposed in a vertical shell, but that is a matter of structural convenience only. The same function will be produced in any horizontal or stepwise arrangement of the compartments, provided only that the stream is caused to flow from the top of one compartment into a space below the partition plate in the next.

The system here shown is advantageous over methods and apparatus heretofore used in wholly avoiding the mechanical pumping of acid or acid distillates, the entire system being actuated by a pump or pumps handling clean hydrocarbons. It is also advantageous in the form of contactor shown, which affords a particularly effective contact between the hydrocarbon reactants and the acid catalyst in an apparatus of simple and inexpensive construction.

We claim as our invention:

1. The process of catalyzing a feed stream of mixed hydrocarbons by means of a liquid acid catalyst which comprises: establishing a succession of zones of contact between bodies of said catalyst and said hydrocarbon stream; passing said stream through said zones successively, said stream entering the lower portion of each said zone at velocities sufficient to ensure turbulence therein and the carrying forward of a portion of said catalyst from zone to zone and out of the last of said zones in entrainment in said hydrocarbons, said entrainment of catalyst being in amount at least sufficient to permit maintenance of the catalytic efficiency of said bodies of catalyst through replacement of spent catalyst; separating said entrained catalyst from the stream emerging from the last of said zones; regenerating at least a portion of said separated catalyst; separating unreacted hydrocarbons from the catalyst-free stream; creating a stream of said unreacted hydrocarbons; returning said stream under high pressure to one of said zones, and aspirating into said high pressure stream the catalyst separated from said emerging stream.

2. The process of catalyzing a feed stream of mixed hydrocarbons by means of a liquid acid catalyst which comprises: establishing a vertically arranged succession of liquid contacting zones and maintaining a layer of said liquid catalyst in the lower part of each of said zones; passing said hydrocarbon stream upwardly through said succession of zones and through said catalyst layers at such velocity as to produce turbulence therein and to carry portions of said catalyst forward from zone to zone in amount at least sufficient to permit maintenance of the catalytic efficiency of said layers of catalyst through replacement of spent catalyst; withdrawing from the uppermost of said zones a stream of hydrocarbons having liquid catalyst suspended therein; separating said catalyst from said stream; regenerating at least a portion of said separated catalyst; separating unreacted hydrocarbons from said stream; creating a stream of said unreacted hydrocarbons; returning said stream to the first of said zones and aspirating into said returned stream the aforesaid separated liquid catalyst.

JOHN C. BOLINGER.
PAUL W. PRUTZMAN.